United States Patent
Krishnan et al.

(10) Patent No.: US 7,095,790 B2
(45) Date of Patent: Aug. 22, 2006

(54) TRANSMISSION SCHEMES FOR MULTI-ANTENNA COMMUNICATION SYSTEMS UTILIZING MULTI-CARRIER MODULATION

(75) Inventors: Ranganathan Krishnan, San Diego, CA (US); Anand D. Subramaniam, La Jolla, CA (US); Tamer Kadous, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 165 days.

(21) Appl. No.: 10/375,191

(22) Filed: Feb. 25, 2003

(65) Prior Publication Data

US 2004/0165676 A1 Aug. 26, 2004

(51) Int. Cl.
*H04K 1/10* (2006.01)
*H04J 11/00* (2006.01)

(52) U.S. Cl. ...................... 375/260; 370/210
(58) Field of Classification Search ............... 375/135, 375/146, 267, 299; 370/208, 209, 210, 320, 370/335, 342; 455/101, 500
See application file for complete search history.

(56) References Cited

U.S. PATENT DOCUMENTS

| | | | | |
|---|---|---|---|---|
| 5,867,478 A | * | 2/1999 | Baum et al. | 370/203 |
| 6,144,711 A | * | 11/2000 | Raleigh et al. | 375/347 |
| 6,151,328 A | * | 11/2000 | Kwon et al. | 370/441 |
| 6,473,467 B1 | * | 10/2002 | Wallace et al. | 375/267 |
| 6,529,496 B1 | * | 3/2003 | Yeom et al. | 370/345 |
| 6,600,934 B1 | * | 7/2003 | Yun et al. | 455/562.1 |
| 6,947,748 B1 | * | 9/2005 | Li et al. | 455/450 |
| 2002/0041635 A1 | * | 4/2002 | Ma et al. | |
| 2002/0115473 A1 | * | 8/2002 | Hwang et al. | |
| 2002/0122383 A1 | * | 9/2002 | Wu et al. | |
| 2004/0131007 A1 | * | 7/2004 | Smee et al. | |

* cited by examiner

*Primary Examiner*—Young T. Tse
(74) *Attorney, Agent, or Firm*—Philip R. Wadsworth; Sandip (Micky) S. Minhas; Dmitry R. Milikovsky

(57) ABSTRACT

Pilot and data transmission schemes for multi-antenna communication systems utilizing multi-carrier modulation are provided. Subband multiplexing is used to avoid interference resulting from transmitting multiple signals simultaneously from multiple antennas. M usable subbands are initially arranged to form multiple groups of subbands, with each group including a different subset of the usable subbands. Each of T transmit antennas is then assigned one or possibly more subband groups for pilot transmission and typically one subband group for data transmission. Pilot and data may then be transmitted from each antenna on the subbands assigned to that antenna for pilot and data transmission. For each transmit antenna, the transmit power for each assigned subband may be scaled higher such that all of the total transmit power available for the antenna is used for transmission. Pilot and/or data may be transmitted simultaneously from all T antennas on all usable subbands without causing mutual interference.

32 Claims, 11 Drawing Sheets

TRANSMISSION SCHEMES FOR MULTI-ANTENNA COMMUNICATION SYSTEMS UTILIZING MULTI-CARRIER MODULATION

BACKGROUND

I. Field

The present invention relates generally to data communication, and more specifically to pilot and data transmission schemes for multi-antenna communication systems utilizing multi-carrier modulation.

II. Background

A multi-antenna communication system employs multiple (T) transmit antennas and one or more (R) receive antennas for pilot and data transmission. The T transmit antennas may be used to increase throughput by transmitting independent data streams from these antennas. The T transmit antennas may also be used to improve reliability by transmitting a single data stream redundantly from these antennas.

In a multi-antenna communication system, it may be necessary to estimate the channel gains between the T transmit antennas and the R receive antennas. The channel estimate may be needed to determine a particular mode to use for data transmission, to process a received data transmission, and so on. Channel estimation is typically performed by transmitting pilot symbols that are known a priori by the receiver. The receiver can then estimate the channel gains as the ratio of the received pilot symbols over the known pilot symbols.

Channel estimates obtained based on pilot transmission are normally impaired by both noise and interference. The noise can come from various sources, such as the wireless channel, receiver electronics, and so on. Noise impairment can typically be addressed by properly designing a pilot signal and/or transmitting the pilot signal for a sufficient period of time such that channel estimates of a particular desired quality can be obtained by the receiver.

For a multi-antenna system, the interference can result from transmitting the pilot signal simultaneously from all T transmit antennas. This is because the pilot signal transmitted from each antenna acts as interference to the pilot signals transmitted from the other antennas.

The same interference phenomenon occurs when the T transmit antennas are used for data transmission. In particular, if the same signal is redundantly transmitted from multiple antennas without addressing interference, then signal cancellation may occur at the receiver depending on the channel conditions and the specific location of the receiver. Consequently, greater throughput and/or reliability would not be achieved by the simultaneous transmission of data from multiple antennas.

There is therefore a need in the art for transmission schemes that can effectively address interference in multi-antenna communication systems.

SUMMARY

Pilot and data transmission schemes for multi-antenna communication systems utilizing multi-carrier modulation are provided herein. In an aspect, subband multiplexing is used to avoid interference resulting from transmitting multiple signals simultaneously from multiple antennas.

With subband multiplexing, M usable subbands provided by multi-carrier modulation (e.g., OFDM) are initially arranged to form multiple groups of subbands, with each group including a different subset of the usable subbands. The subband groups may be formed in various manners as described below. Each of the T transmit antennas is then assigned one or possibly more subband groups for pilot transmission and typically one subband group for data transmission.

The subband groups used for pilot transmission may be the same or different from the subband groups used for data transmission. Pilot and data may then be transmitted from each antenna on the subbands assigned to that antenna for pilot and data transmission. With subband multiplexing, pilot and/or data may be transmitted simultaneously from all T antennas on all usable subbands without causing interference.

Other techniques may also be used to improve performance for pilot and data transmissions. For example, for each transmit antenna, the transmit power for each subband assigned to the antenna may be scaled higher such that all or as much of the total transmit power available for that antenna is used for transmission. For pilot transmission occurring over multiple symbol periods, the subbands assigned to the T transmit antennas may be permutated. Subband permutation allows more subbands to be used by each antenna, and improved channel estimates may be obtained while still avoiding interference.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." An embodiment or design described herein as "exemplary" is not necessarily to be construed as preferred or advantageous over other embodiments or designs.

The pilot and data transmission schemes described herein may be used for various multi-antenna communication systems and with various multi-carrier modulation techniques. For clarity, these transmission schemes are specifically described for a multi-antenna system that utilizes orthogonal frequency division multiplexing (OFDM).

Figure 1A:
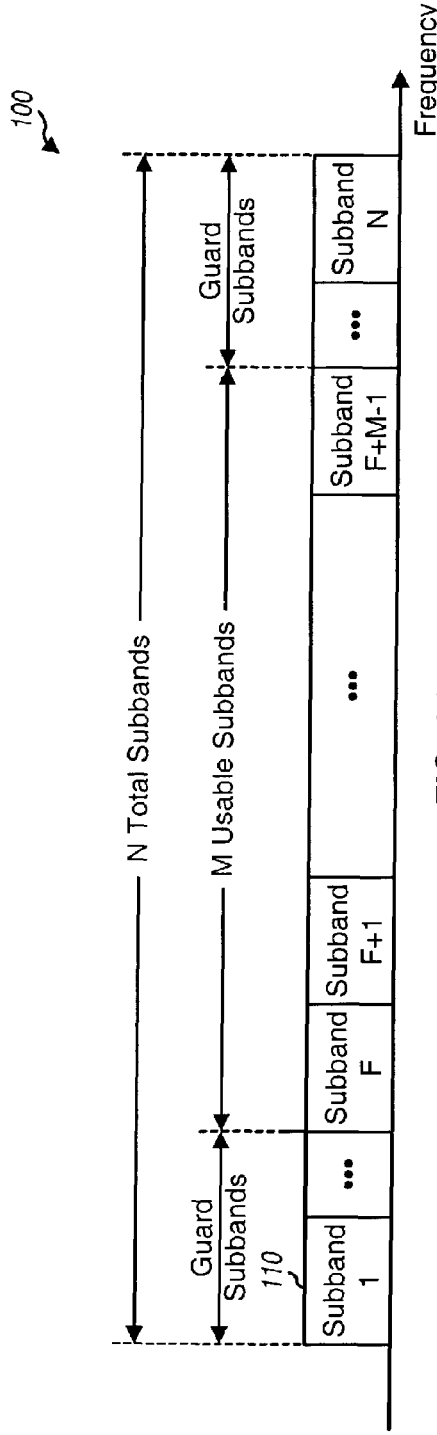
FIG. 1A shows an OFDM subband structure.

FIG. 1A shows an OFDM subband structure 100 that may be used for a multi-antenna communication system. The system has an overall system bandwidth of W MHz, which is partitioned into N orthogonal subbands using OFDM. In a typical OFDM system, only M of the N total subbands are used for pilot and data transmission, where M<N. The remaining N−M subbands are not used for pilot/data transmission and serve as guard subbands to allow the system to meet spectral mask requirements. The M usable subbands include subbands F through F+M−1, where F is an integer typically selected such that the M usable subbands are centered in the middle of the operating band.

For OFDM, the data or pilot to be transmitted on each usable subband is first modulated (i.e., mapped to modulation symbols) using a particular modulation scheme. A signal value of zero is provided for each of the N−M unused subbands. For each OFDM symbol period, N symbols (e.g., M modulation symbols and N−M zeros) for the N total subbands are transformed to the time domain using an inverse fast Fourier transform (IFs) to obtain a "transformed" symbol that comprises N time-domain samples. To combat inter-symbol interference (ISI) caused by frequency selective fading, a portion of each transformed symbol is repeated to form a corresponding OFDM symbol comprised of N+C samples, where C is the number of samples being repeated. The repeated portion is often referred to as a cyclic prefix. The OFDM symbol is then transmitted over the wireless channel. In an exemplary design, the system bandwidth is W=20 MHz, the total number of subbands is N=256, the number of usable subbands is M=224, and the duration of each transformed symbol is 12.8 μsec. An OFDM symbol period (or simply, a symbol period) corresponds to the duration of one OFDM symbol.

As noted above, subband multiplexing is used to avoid interference resulting from transmitting multiple signals simultaneously from multiple antennas. With subband multiplexing, pilot and/or data are transmitted simultaneously from the T antennas on groups of subbands that are "disjoint" (where disjoint is described below) so that interference is avoided. Numerous pilot and data transmission schemes may be defined with subband multiplexing. Some of these transmission schemes are described below.

Figure 1B:
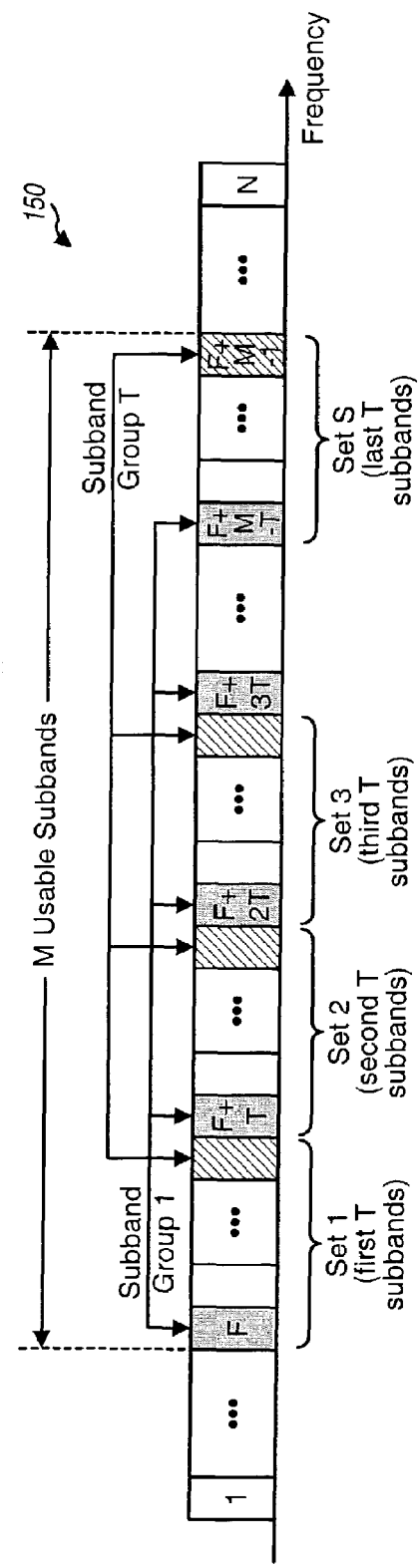
FIG. 1B shows a subband structure that supports subband multiplexing.

FIG. 1B shows a subband structure 150 that supports subband multiplexing. In this embodiment, the M usable subbands are initially divided into S disjoint sets, with each set including T consecutive subbands, where T·S≦M. The T subbands in each set are then assigned to T groups such that the i-th subband in each set is assigned to the i-th group. With this subband assignment scheme, the S subbands in each group are uniformly distributed across the M usable subbands, and consecutive subbands in the group are spaced apart by T subbands. The T groups of subbands may be assigned to the T transmit antennas for pilot/data transmission.

In general, the M usable subbands may be assigned to the T groups in various manners, and this is within the scope of the invention. The T groups may include the same or different numbers of subbands. Moreover, the subbands in each group may be uniformly or non-uniformly distributed across the M usable subbands. The only requirement is that the T subband groups are disjoint from one another so that interference is avoided. For simplicity, the following description assumes that each of the T subband groups includes S subbands, the subbands in each group are uniformly distributed and are spaced apart by T subbands (as shown in FIG. 1B), and T·S=M.

Figure 2A:
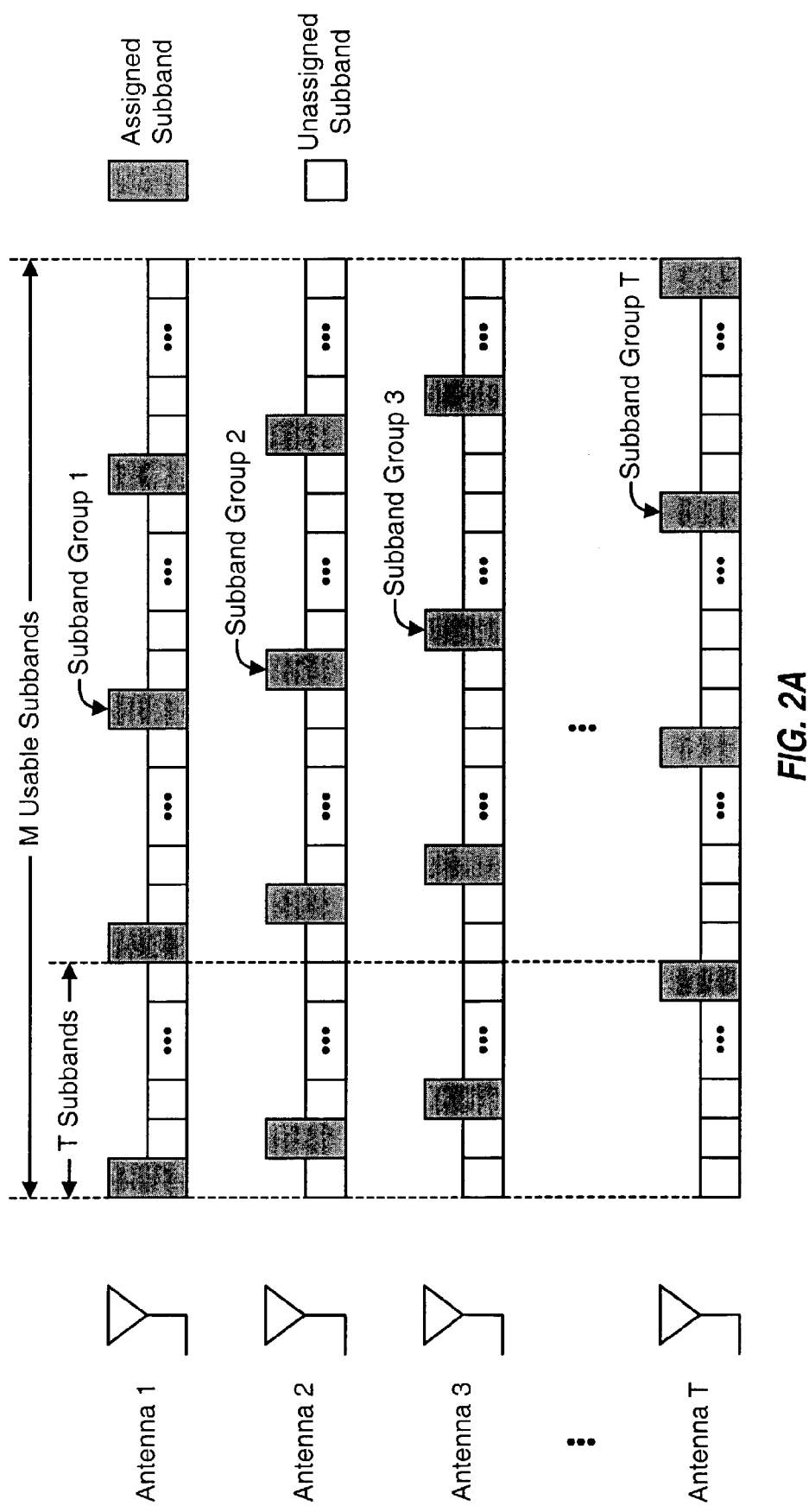
FIG. 2A shows an exemplary pilot/data transmission from T antennas using subband multiplexing.

FIG. 2A shows an exemplary pilot/data transmission from the T antennas using subband multiplexing. Each of the T antennas is assigned a respective group of subbands. In FIG. 2A, subband group 1 is assigned to antenna 1, subband group 2 is assigned to antenna 2, and so on, and subband group T is assigned to antenna T. These T subband groups may be formed as described above for FIG. 1B. Each group includes S subbands that are shown by the shaded boxes. The pilot/data transmission from each antenna occurs on only the subbands assigned to that antenna.

As shown in FIG. 2A, if pilot/data is transmitted from each antenna on only the subbands assigned to the antenna, then there will be no interference among the transmissions from the T antennas. This is because the subbands are orthogonal to one another, and each subband is used by at most one antenna for transmission. Thus, interference is avoided even though T transmissions are sent simultaneously from the T antennas.

In a typical wireless communication system, each antenna may be associated with a total transmit power of $P_{ant}$, which is the maximum transmit power that may be used for the pilot/data transmission from that antenna. This $P_{ant}$ may be dictated by the peak output of a power amplifier for the antenna, by regulatory constraint, and/or by some other requirements. Improved performance may be achieved by using all or as much of the total transmit power as possible for the pilot/data transmission from each antenna. In particular, since only S of the M usable subbands are assigned to each antenna, where S=M/T for simplicity, the transmit power for each of the S subbands assigned to each antenna may be increased by a factor of T. This would then allow a higher received signal-to-noise (SNR) to be achieved for each of the S subbands of each antenna.

In a first pilot transmission scheme, pilot is transmitted simultaneously from the T antennas using subband multiplexing. The subband groups are formed such that the number of subbands in each group is greater than the maximum expected delay spread of the system. The delay spread for a given receiver is the difference between the earliest and latest arriving signal instances at the receiver for a signal transmitted by a transmitter. The delay spread (L) of the system is the expected worst-case delay spread for all receivers in the system, which may be dispersed throughout the coverage area of the system. To effectively combat ISI, the cyclic prefix should be longer than the delay spread of the system (i.e., C>L, where the delay spread L is given in units of sample period). The number of subbands in each group may then be selected to be greater than or equal to the number of samples for the cyclic prefix (i.e. S≧C ).

The derivation of channel estimates for all M usable subbands based on pilot transmission on a subset of these M subbands is described In detail in U.S. patent application Ser. No. 10/340,130, entitled "Channel Estimation for OFDM Communication Systems," filed Jan. 10, 2003, and provisional U.S. patent application Ser. No. 60/427,896, entitled "Reduced Complexity Channel Estimation for Wireless Communication Systems," filed Nov. 19, 2002, both assigned to the assignee of the present application and incorporated herein by reference.

For improved performance, the transmit power per assigned subband for each of the T antennas may be increased by a factor of T. For each antenna, this would then result in the total energy of the pilot transmission on the S assigned subbands to be the same as if all M usable subbands are used for pilot transmission. The higher transmit power per subband would allow the receiver to obtain higher quality channel estimates.

If the number of subbands assigned to each antenna is equal to or greater than the delay spread of the system (i.e., $S \geq L$), then the channel gains for all M usable subbands for the antenna may be estimated based on the pilot transmission on just the S subbands assigned to the antenna. Moreover, if the transmit power for each of the S subbands assigned to each antenna is increased by a factor of T, then the quality of the channel estimates obtained based on pilot transmission on only S subbands would be approximately the same as that of the channel estimates obtained based on pilot transmission on all M usable subbands with the same amount of transmit power. That is, by maintaining the same total pilot energy, the receiver would be able to estimate the channel gains for all M usable subbands based on pilot transmission on only a subset of these subbands with little or no loss in quality.

The first pilot transmission scheme allows all T antennas to transmit pilot simultaneously. To obtain channel estimates of comparable quality, a conventional scheme that transmits pilot on all M usable subbands simultaneously from all T antennas would require a transmission duration that is approximately T times longer than that required by the first pilot transmission scheme. For example, if $N_P \cdot T$ pilot OFDM symbols are needed to obtain channel estimates of a particular quality using the conventional scheme, then channel estimates of comparable quality may be obtained based on $N_P$ pilot OFDM symbols transmitted on T antennas. This assumes that (1) each antenna is assigned a sufficient number of subbands, which is equal to or greater than the cyclic prefix, and (2) power scaling is used such that the total transmit power available for each antenna is used for pilot transmission on the assigned subbands. The power scaling is described in the aforementioned U.S. patent application Ser. No. 10/340,130. Thus, the first pilot transmission scheme can reduce pilot overhead by a factor of up to T, which is the number of transmit antennas.

In a second pilot transmission scheme, pilot is transmitted simultaneously from the T antennas using subband multiplexing and subband permutation. The pilot may need to be transmitted over multiple OFDM symbol periods. This may be the case, for example, if the pilot needs to be averaged over a longer period of time to obtain a reasonably accurate estimate of the channel gains. In this case, additional improvement in the channel estimates may be obtained by assigning multiple groups of subbands to each antenna for pilot transmission.

Figure 2B:
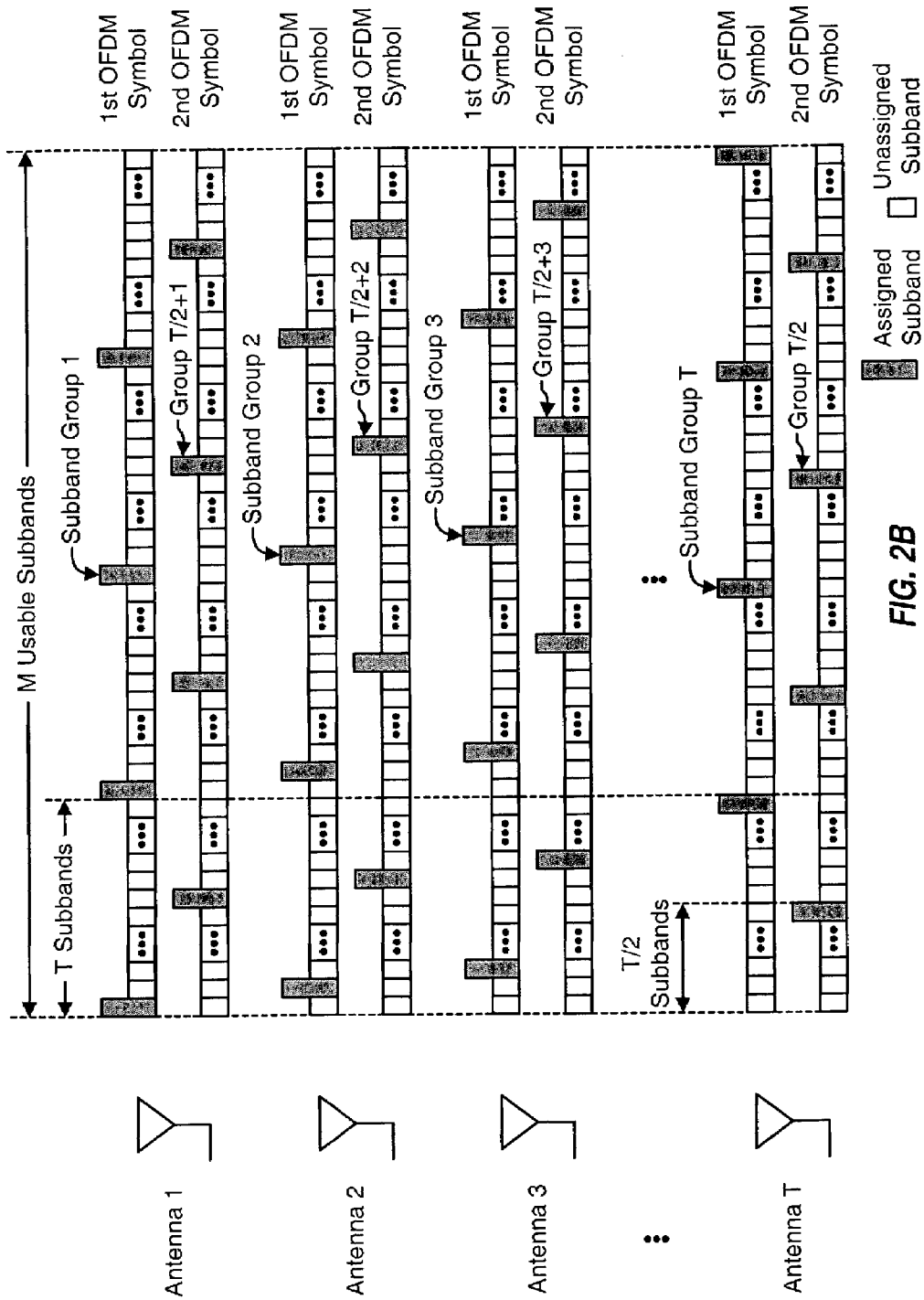
FIG. 2B shows an exemplary pilot transmission from T antennas using subband multiplexing and subband permutation.

FIG. 2B shows an exemplary pilot transmission from the T antennas using subband multiplexing and subband permutation. For this example, the pilot transmission occurs over two OFDM symbol periods. Each of the T antennas is assigned two groups of subbands (e.g., groups i and T/2+i are assigned to the i-th antenna), with each group containing the subbands shown by the shaded boxes. The two groups assigned to each antenna may be selected such that the subbands in these groups are spaced apart by T/2 subbands. Moreover, the groups are assigned to the T antennas such that, for each OFDM symbol period, disjoint groups are used by the T antennas for pilot transmission. A given subband group may be assigned to multiple antennas (e.g., subband group 1 may be assigned to antennas 1 and T/2+1), but these antennas would use this subband group in different symbol periods.

In FIG. 2B, subband groups 1 and T/2+1 are assigned to antenna 1, subband groups 2 and T/2+2 are assigned to antenna 2, and so on, and subband group T and T/2 are assigned to antenna T. For the first OFDM symbol period, subband group 1 is used for antenna 1, subband group 2 is used for antenna 2, and so on, and subband group T is used for antenna T. For the second OFDM symbol period, subband group T/2+1 is used for antenna 1, subband group T/2+2 is used for antenna 2, and so on, and subband group T/2 is used for antenna T.

The channel gains for each of the T antennas may then be estimated based on pilot transmissions received in two groups of subbands. With subband permutation, the total number of subbands used for each antenna is 2S instead of S, and improved channel estimates may be obtained for all M usable subbands because of the larger number of subbands used for pilot transmission.

For simplicity, FIG. 2B shows subband multiplexing and permutation for an exemplary pilot transmission that occurs over two OFDM symbol periods. In general, the pilot transmission can occur over Q OFDM symbol periods, where Q may be any integer one or greater. Each antenna may then be assigned Q subband groups, with each group including S subbands. Each antenna would then be assigned a total of S·Q subbands that may be equally spaced apart by T/Q subbands. If $Q \geq 2$, then for each antenna, the subbands in each of the Q groups may be "interlaced" with the subbands in the other Q−1 groups. The interlacing may be such that each Q consecutive subbands assigned to a given antenna are included in the Q groups assigned to the antenna. The Q subband groups assigned to each antenna are used for Q OFDM symbol periods, with a different one of the Q groups being used for each symbol period. For each symbol period, the T antennas would simultaneously transmit pilot using T disjoint groups of subbands.

The transmission schemes shown in FIGS. 2A and 2B may be used for data transmission as well as for pilot transmission. However, for data transmission, it is often desirable to transmit data from multiple antennas (instead of a single antenna) for each of the M usable subbands. The use of multiple antennas for each subband provides transmit diversity, which may increase the diversity order of the signal detection at the receiver. Transmit diversity can improve reliability and robustness of data transmission, thereby resulting in a lower error rate and/or greater resilience to path loss.

Transmit diversity may be achieved with various diversity schemes. Some examples of such diversity schemes include a space-time transmit diversity (STTD) scheme and a Walsh-STTD scheme. For the STTD scheme, a single data stream may be processed to provide two symbol streams that may be transmitted from two antennas (or two sets of antennas with subband multiplexing). For the Walsh-STTD scheme, a single data stream may be processed to provide W symbol streams that may be transmitted from W antennas (or W sets of antennas with subband multiplexing), where W is twice the length of an orthogonal code (e.g., Walsh code) used for Walsh-STTD processing. These two diversity schemes are described in detail below.

For the STTD scheme, if multiple pairs of antennas are available, then simply transmitting the same pair of symbol streams from each pair of antennas may result in signal cancellation at the receiver. Improved reliability would then not be obtained by simply transmitting data redundantly from all antennas.

In a first data transmission scheme, data is transmitted simultaneously from pairs of antennas using subband multiplexing. This transmission scheme may be used for the STTD scheme and equivalent diversity schemes. For this data transmission scheme, the M usable subbands are initially arranged to form T/2 disjoint groups of subbands, with each usable subband being assigned to only one group. The T/2 groups may include the same or different number of subbands. The subbands in each group may be uniformly or non-uniformly distributed across the M usable subbands. The M usable subbands may thus be assigned to the T/2 groups in various manners, and this is within the scope of the invention. In one embodiment that is described below, each group includes 2S subbands that are uniformly distributed such that consecutive subbands in the group are spaced apart by T/2 subbands. The T/2 subband groups are then assigned to T/2 pairs of antennas, one subband group to each antenna pair.

Figure 3A:
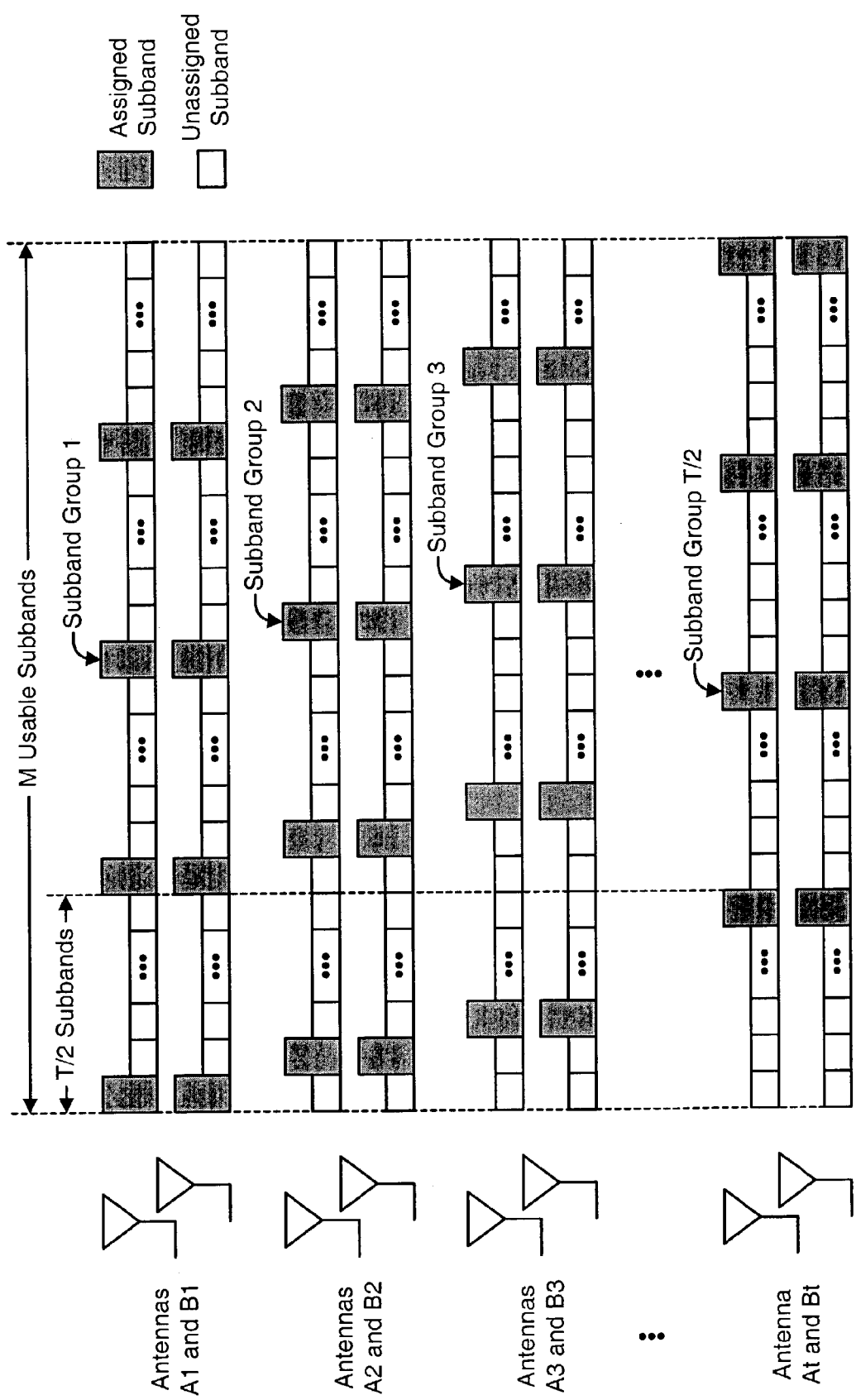
FIG. 3A shows an exemplary data transmission from T antennas using subband multiplexing and transmit diversity.

FIG. 3A shows an exemplary data transmission from the T antennas using subband multiplexing and transmit diversity. The T antennas are arranged into T/2 pairs, where the i-th pair includes two antennas that are denoted as Ai and Bi. Each of the T/2 antenna pairs is assigned a respective group of subbands, where the T/2 subband groups may be formed as described above. In FIG. 3A, subband group 1 is assigned to pair 1 comprised of antennas A1 and B1, subband group 2 is assigned to pair 2 comprised of antennas A2 and B2, and so on, and subband group T/2 is assigned to pair T/2 comprised of antennas At and Bt (where t=T/2). Data may be transmitted from each pair of antennas on the subbands assigned to that antenna pair.

The STTD scheme may be used to provide a pair of symbol streams, which may be demultiplexed to provide a pair of symbol substreams for each pair of antennas. T/2 pairs of symbol substreams may thus be generated by the STTD scheme for the T/2 pairs of antennas. The symbol substream for each antenna would include, for each OFDM symbol period, one data symbol for each of the subbands assigned to the antenna and a signal value of zero for each of the remaining subbands. As shown in FIG. 3A, the pair of symbol substreams for antenna pair 1 are transmitted on subband group 1, the pair of symbol substreams for antenna pair 2 are transmitted on subband group 2, and so on, and the pair of symbol substreams for antenna pair T/2 are transmitted on subband group T/2. Although these T/2 pairs of symbol substreams are transmitted simultaneously from the T/2 pairs of antennas, they do not interfere with each other because they are transmitted on disjoint groups of subbands. Thus, the deleterious effects due to destructive interference between the transmissions from different antenna pairs are avoided.

For improved performance, each symbol substream may be transmitted from the associated antenna with the total transmit power $P_{ant}$ available for that antenna. Since only 2S of the M usable subbands are used for each of the T antennas (where S=M/T for simplicity), the transmit power for each of the 2S subbands assigned to each antenna may be increased by a factor of T/2. This would then allow a higher received SNR to be achieved for each of the 2S subbands assigned to each antenna. The higher received SNR for each subband may support a higher data rate, which would then improve the overall system throughput.

FIG. 3A shows one exemplary assignment of the M usable subbands to the T antennas. The usable subbands may also be assigned to the T antennas in various other manners, and this is within the scope of the invention. For example, the subbands may be assigned to the antennas such that different pairings of antennas are used for data transmission. This may provide additional diversity.

Figure 3B:
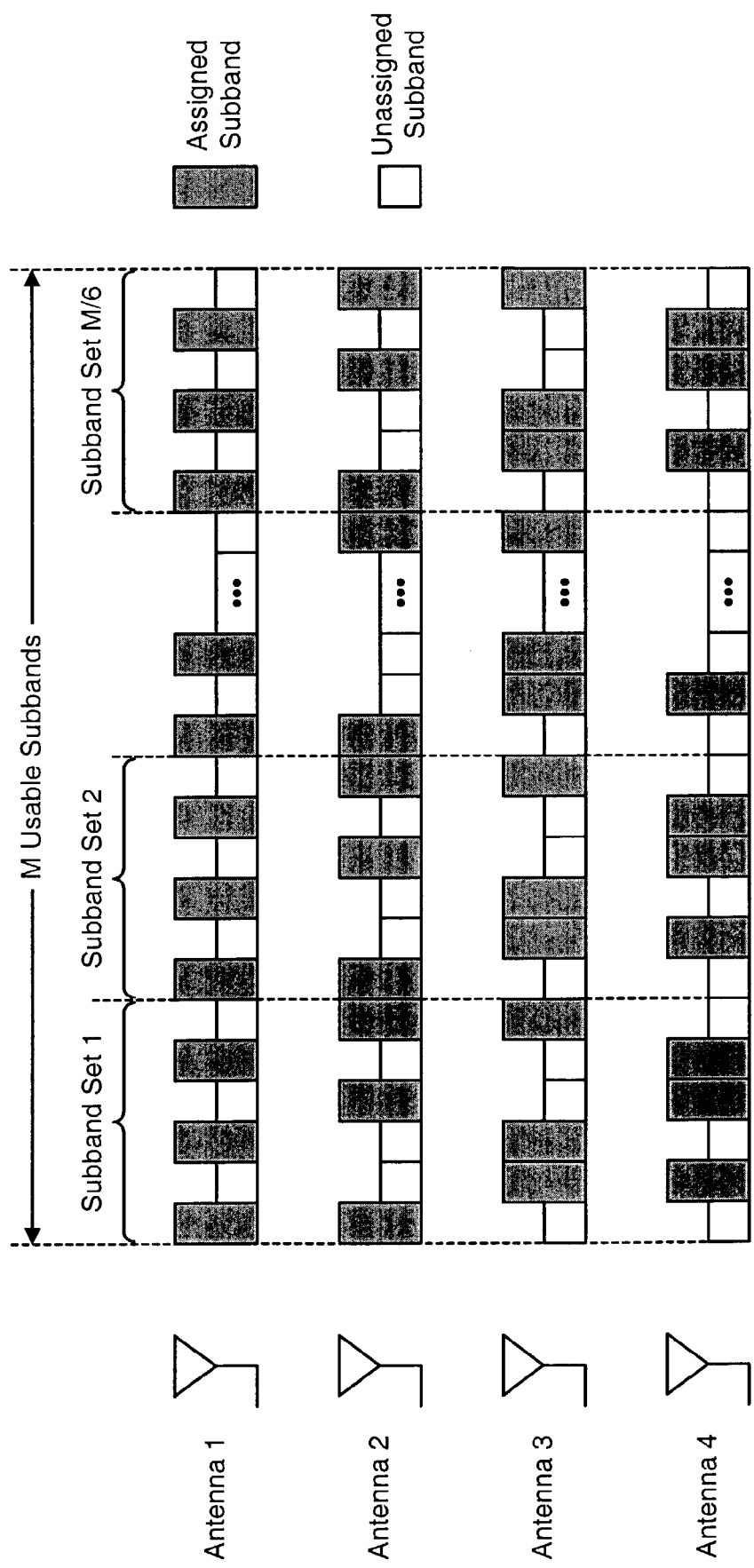
FIG. 3B shows an exemplary data transmission from T antennas using subband multiplexing and different antenna pairings for transmit diversity.

FIG. 3B shows an exemplary data transmission from the T antennas using subband multiplexing and different antenna pairings for transmit diversity. For simplicity, the description for FIG. 3B assumes that T=4 antennas are used for data transmission. Six different antenna pairings may be formed with four antennas, and these antenna pairings are denoted as {1,2}, {3,4}, {1,3}, {2,4}, {1,4}, and {2,3}.

The M usable subbands may be initially divided into M/6 sets, with each set including 6 subbands. The 6 subbands in each set may then be assigned to the 6 different antenna pairings, one subband to each pairing. In FIG. 3B, the first subband in each set is assigned to antenna pairing {1,2}, the second subband in each set is assigned to antenna pairing {3,4}, and so on, and the last subband in each set is assigned to antenna pairing {2,3}.

The data stream to be transmitted from the four antennas may be processed using the STTD scheme to obtain two symbol streams. The first symbol stream may be transmitted from the first or left antenna in the 6 pairings, and the second symbol stream may be transmitted from the second or right antenna in the 6 pairings. The first and second symbol streams may then be demultiplexed to form four symbol substreams, one substream for each of the four antennas. Each symbol substream includes a data symbol for each of the subbands assigned to the associated antenna and a zero signal value for each of the unassigned subbands.

The four symbol substreams may be transmitted simultaneously from the four antennas.

However, these symbol substreams do not interfere with each other because they are transmitted on four "disjoint" groups of subbands. The subband groups are disjoint in that each of the M usable subbands is assigned to only one antenna pair, as shown in FIG. 3B.

In a second data transmission scheme, data is transmitted from groups of W antennas using subband multiplexing, where W may be any integer one or greater. This transmission scheme may be used for the Walsh-STTD scheme and other diversity schemes. For this data transmission scheme, the M usable subbands are initially arranged to form T/W disjoint groups of subbands, with each subband being assigned to only one group. The T/W groups may include the same or different numbers of subbands. The subbands in each group may be uniformly or non-uniformly distributed across the M usable subbands. In one embodiment that is described below, each group includes S·W subbands (where S=M/T) that are uniformly distributed such that consecutive subbands in the group are spaced apart by T/W subbands. For W>1, this second transmission scheme allows more subbands to be assigned to each antenna than the first transmission scheme described above. More subbands per antenna may be advantageous for some applications. The T/W subband groups are assigned to T/W groups of antennas, one subband group to each antenna group, where each antenna group includes W antennas. Data may be transmitted from each antenna on the subbands assigned to the antenna.

Figure 3C:
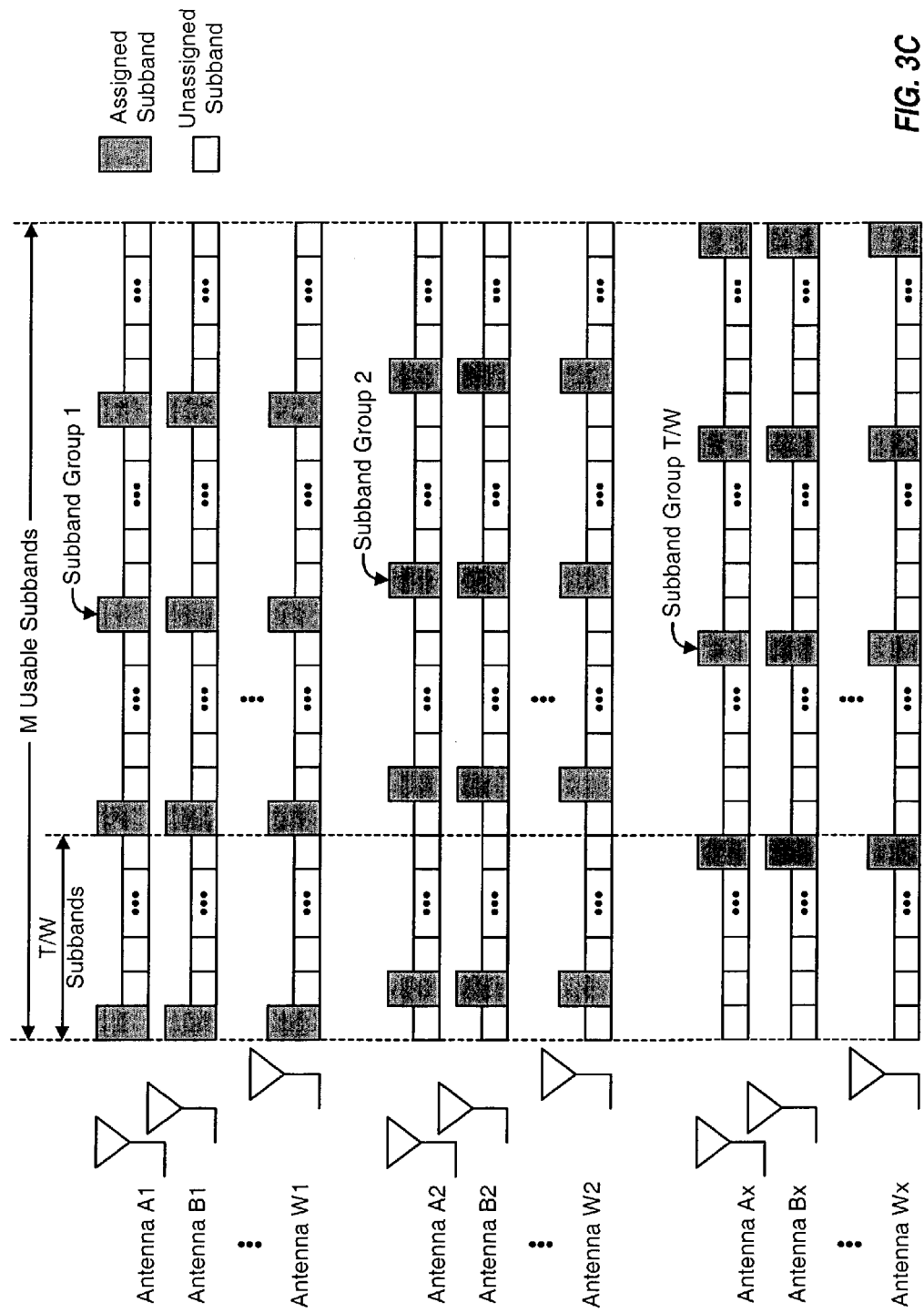
FIG. 3C shows an exemplary data transmission from groups of W antennas using subband multiplexing.

FIG. 3C shows an exemplary data transmission from groups of W antennas using subband multiplexing. The T antennas are arranged into T/W groups, where the i-th group includes W antennas that are denoted as Ai, Bi, through Wi.

Each of the T/W antenna groups is assigned a respective group of subbands, where the T/W subband groups may be formed as described above.

A single data stream may be processed using the Walsh-STTD scheme to provide W symbol streams, where W is twice the length of an orthogonal sequence (e.g., a Walsh sequence) used for the processing. The W symbol streams may be demultiplexed to provide T/W groups of symbol substreams, with each group including W symbol substreams. The T/W groups would then collectively include T symbol substreams. One group of symbol substreams is provided to each group of antennas, and each antenna is provided with a respective symbol substream. The symbol substream for each antenna would include, for each OFDM symbol period, one data symbol for each of the subbands assigned to the antenna and a zero signal value for each of the remaining subbands. The T symbol substreams are transmitted simultaneously from the T antennas. However, these symbol substreams do not interfere with each other because they are transmitted on disjoint groups of subbands, since each subband is assigned to only one group.

FIGS. 2A and 2B and 3A through 3C show some exemplary subband multiplexing schemes that may be used for pilot and data transmission. Numerous other subband multiplexing schemes may also be devices for use, and this is within the scope of the invention. For example, both pilot and data may be transmitted in one OFDM symbol period. In this case, some of the M usable subbands may be used for pilot transmission and the remaining usable subbands may be used for data transmission. The pilot subbands may be multiplexed, for example, as shown in FIG. 2A or 2B. The data subbands may be multiplexed, for example, as shown in FIG. 3A, 3B, or 3C.

Figure 4:
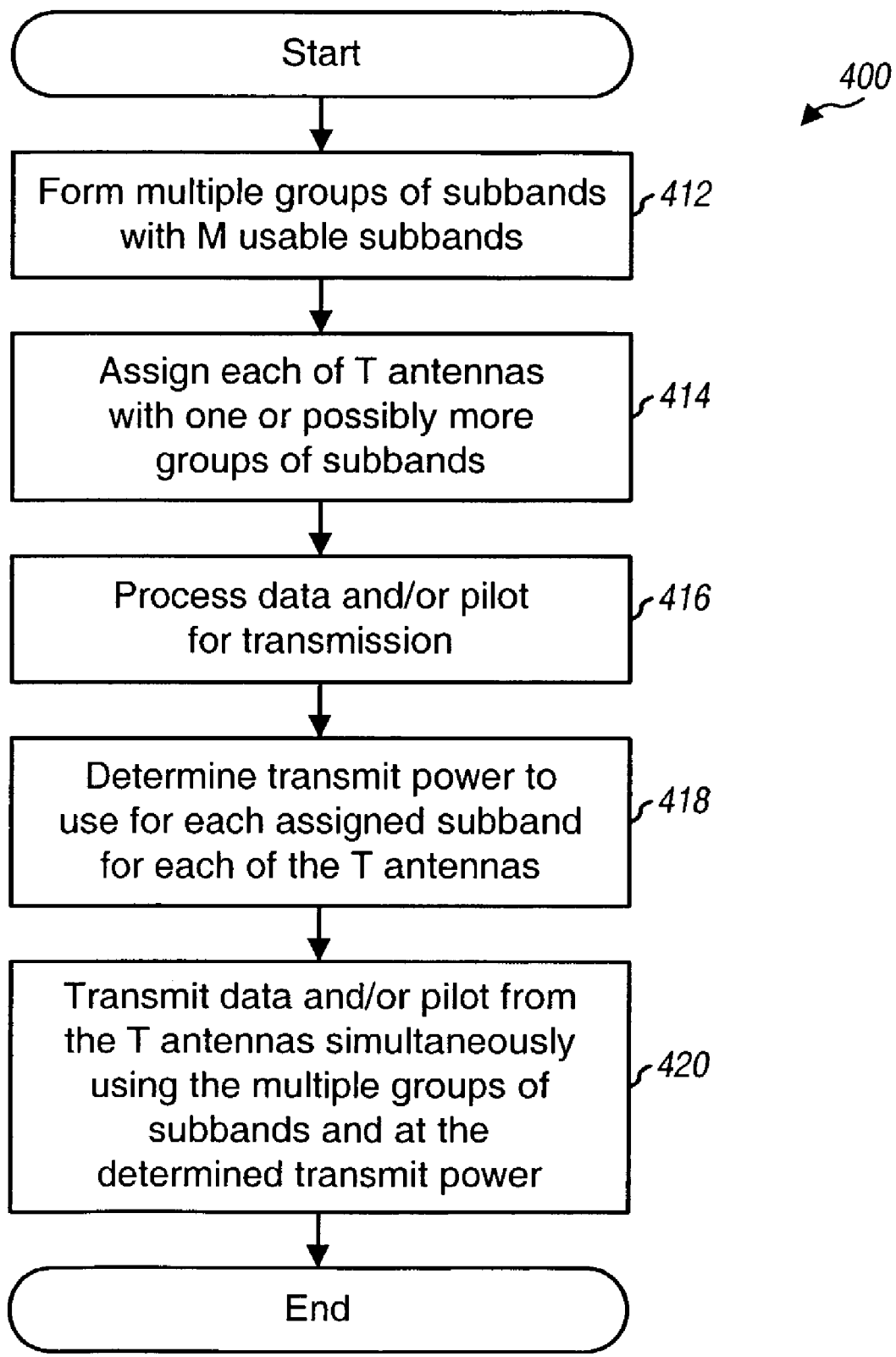
FIG. 4 shows a flow diagram of a process for transmitting pilot and/or data using subband multiplexing.

FIG. 4 shows a flow diagram of an embodiment of a process 400 for transmitting pilot and/or data using subband multiplexing. Initially, the M usable subbands are arranged to form multiple groups of subbands, where each group includes a different subset of the M usable subbands (step 412). The subband groups may be formed as described above.

Each of the T antennas is then assigned one or possibly more groups of subbands for pilot and data transmission (step 414). The subband groups used for pilot transmission may be the same or different from the subband groups used for data transmission. For pilot transmission, each antenna may be assigned a different group of subbands (as described above for FIG. 2A). Alternatively, each antenna may be assigned two or more groups of subbands for subband permutation (as described for FIG. 2B). For data transmission, each pair of antennas may be assigned a different group of subbands (as described for FIG. 3A), each antenna may be assigned a different group of subbands (as described for FIG. 3B), each group of W antennas may be assigned a different group of subbands (as described for FIG. 3C), and so on.

Pilot and/or data to be transmitted is then processed (step 416). For example, data may be processed using STTD encoding, Walsh-STTD encoding, or some other type of encoding. The amount of transmit power to use for each subband assigned to each of the T antennas is also determined (step 418). In particular, the transmit power for each assigned subband may be scaled higher than an average power that would be used if transmission were to occur on all of the M usable subbands. The scaling factor is dependent on the number of subbands assigned to each antenna and the number of usable subbands.

Pilot and/or data is then transmitted from the T antennas simultaneously using the multiple groups of subbands and at the determined transmit power (step 420). The transmission from each antenna occurs on only the group (or groups) of subbands assigned to the antenna. For pilot transmission, only one of the T antennas is typically used in any given symbol period for each of the M usable subbands. For data transmission, a particular group of two (or possibly more) antennas is typically used for each of the M usable subbands.

Figure 5:
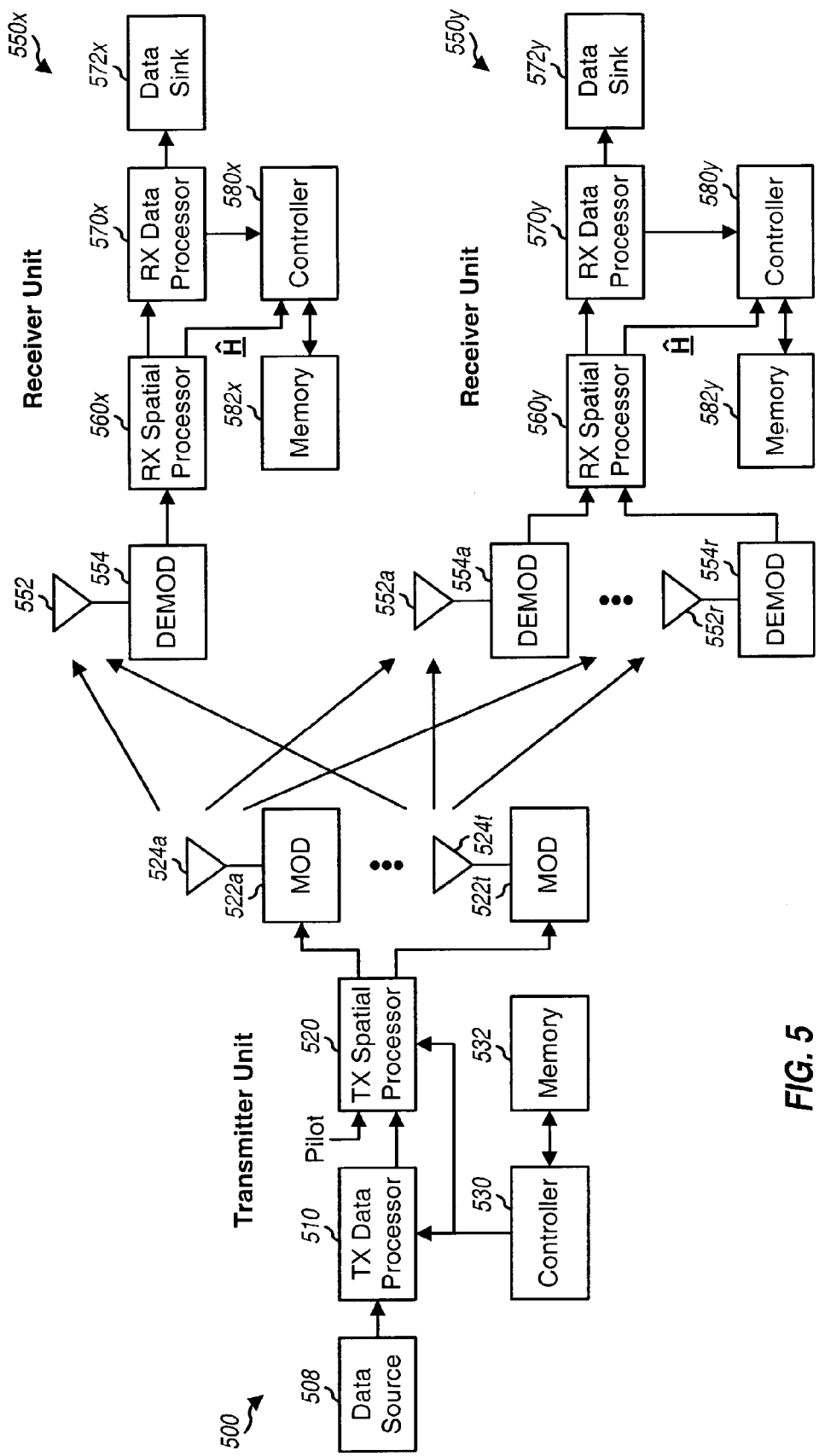
FIG. 5 shows a block diagram of a transmitter unit and two receiver units.

FIG. 5 shows a block diagram of an embodiment of a transmitter unit 500 and two receiver units 550x and 550y in a multi-antenna communication system with multi-carrier modulation (e.g., OFDM). Transmitter unit 500 is equipped with T antennas, receiver unit 550x is equipped with a single antenna, and receiver unit 550y is equipped with R antennas.

At transmitter unit 500, a transmit (TX) data processor 510 receives traffic data from a data source 508 and other data from a controller 530. TX data processor 510 codes, interleaves, and modulates the data to provide modulation symbols, which are also referred to as data symbols. A TX spatial processor 520 receives and multiplexes the data symbols with pilot symbols (e.g., using time division multiplexing or subband multiplexing) and may perform spatial processing for data transmission. For example, TX spatial processor 520 may implement the STTD scheme, the Walsh-STTD scheme, or some other scheme. TX spatial processor 520 provides a stream of transmit symbols for each of the T antennas. (A transmit symbol stream is referred to as a symbol substream in the description above.) Each modulator (MOD) 522 receives and processes a respective transmit symbol stream to provide a corresponding radio frequency (RF) modulated signal. T RF modulated signals are generated by T modulators 522a through 522t and transmitted from T antennas 524a through 524t, respectively.

At each receiver unit 550, the transmitted RF modulated signals are received by one or more antennas 552, and each antenna provides a received signal to a respective demodulator (DEMOD) 554. Each demodulator 554 performs processing complementary to that performed by modulator 522 and provides received symbols. A receive (RX) spatial processor 560 then performs spatial processing on the received symbols from all demodulators 554 to provide recovered symbols, which are estimates of the data symbols sent by the transmitter unit. An RX data processor 570 further processes (e.g., demodulates, deinterleaves, and decodes) the recovered symbols to provide decoded data, which may be provided to a data sink 572 for storage and/or a controller 580 for further processing. RX spatial processor 560 may also estimate the channel gains based on the received pilot and may provide channel estimates (denoted as a channel response matrix ĥ) to controller 580.

Controllers 530 and 580 control the operation of various processing units within the transmitter unit and the receiver unit, respectively. Memory units 532 and 582 store data and program codes used by controllers 530 and 580, respectively.

Figure 6:
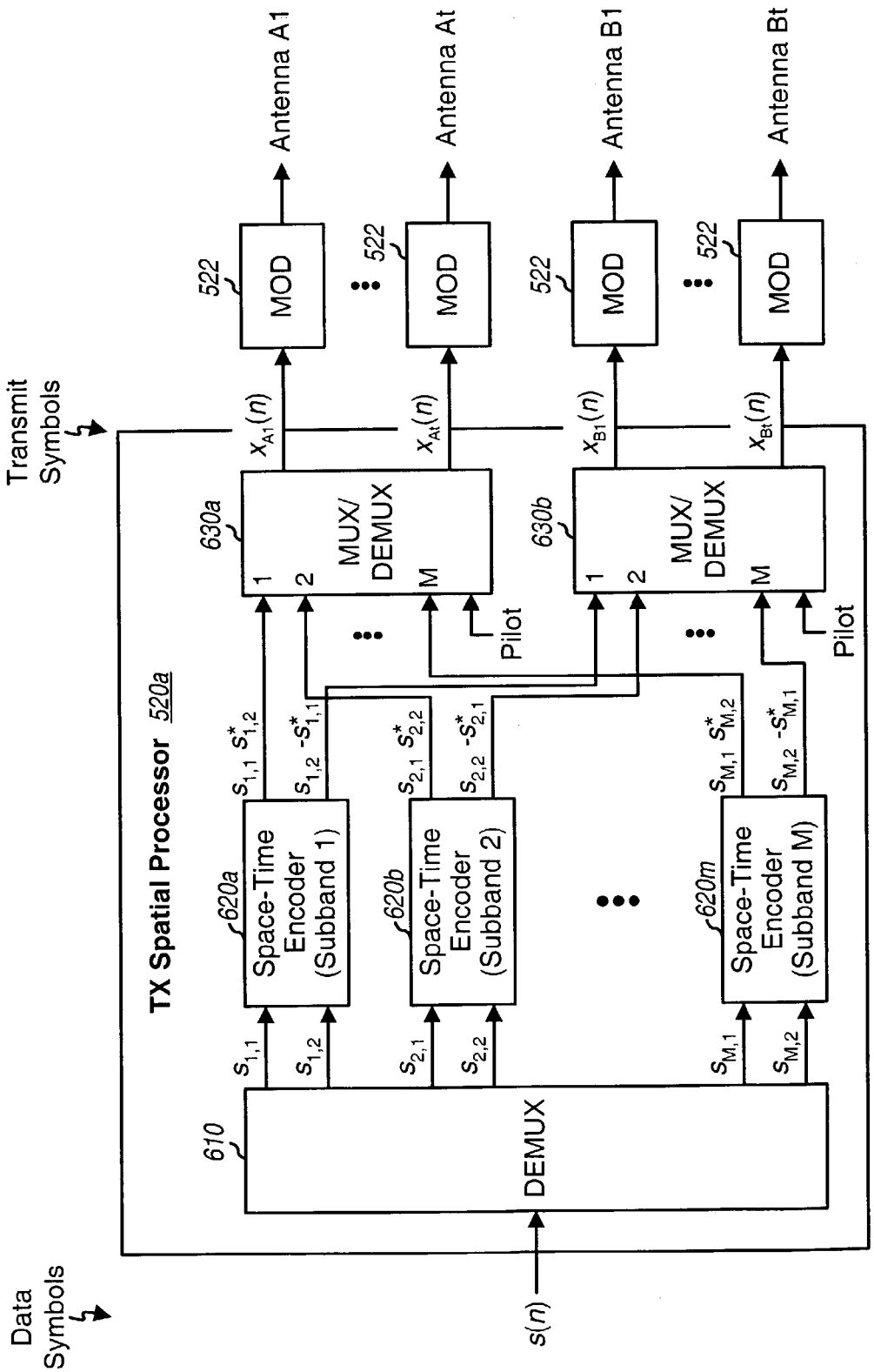
FIG. 6 shows a block diagram of a transmit (TX) spatial processor that implements a space-time transmit diversity (STTD) scheme.

FIG. 6 shows a block diagram of a TX spatial processor 520a, which implements the STTD scheme and is one embodiment of TX spatial processor 520 in FIG. 5. The data symbols s(n) from TX data processor 510 are provided to a demultiplexer 610, which demultiplexes the data symbols into 2M data symbol substreams (denoted as $s_{k,1}(n)$ and $s_{k,2}(n)$, for $k \in \{1 \ldots M\}$), one pair of data symbol substreams for each of the M usable subbands. Each data symbol substream includes one data symbol for each interval of two OFDM symbol periods. The M pairs of data symbol substreams for the M usable subbands are provided to M space-time encoders 620a through 620m.

Each space-time encoder 620 receives and processes its pair of data symbol substreams to provide two space-time encoded symbol substreams for the associated subband. For each pair of data symbols (e.g., $s_{k,1}$ and $s_{k,2}$) in the two input substreams, space-time encoder 620 provides two vectors $\underline{X}_{k,1}$ and $\underline{X}_{k,2}$ with each vector including two space-time encoded symbols (or simply, encoded symbols) that are to be transmitted sequentially in two OFDM symbol periods from an associated antenna. In particular, the vector $\underline{X}_{k,1}$ is transmitted on the k-th subband from one antenna and the vector $\underline{X}_{k,2}$ is transmitted on the k-th subband from another antenna. In one embodiment, the vectors are defined as $\underline{X}^{k,1}=[s_{k,1} s_{k,2}{}^*]^T$ and $\underline{X}_{k,2}=[s_{k,2} -s_{k,1}{}^*]^T$, as show in FIG. 6. In another embodiment, the vectors are defined as $\underline{X}^{k,1}=[s_{k,1} S_{k,2}]^T$ and $\underline{X}_{k,2}=[-s_{k,2}{}^* s_{k,1}{}^*]^T$. The two encoded symbols in each vector have the same magnitude as the data symbols but may be rotated in phase. Each space-time encoder 620 provides two encoded symbol substreams to two multiplexers/demultiplexers 630a and 630b.

Each multiplexer/demultiplexer 630 receives pilot symbols and M encoded symbol substreams from M space-time encoders 620a through 620m, multiplexes the encoded symbols and pilot symbols based on a particular data/pilot transmission scheme, and provides T/2 streams of transmit symbols for T/2 antennas. Each transmit symbol stream includes pilot symbols during pilot transmission and encoded symbols during data transmission, where the pilot and encoded symbols are sent on the subbands assigned to the antenna used to transmit that stream.

During pilot transmission, multiplexers/demultiplexers 630a and 630b collectively provide T streams of transmit symbols for the T antennas. Each transmit symbol stream includes pilot symbols for the subbands assigned to the associated antenna and zero signal values for the unassigned subbands. For the transmission scheme shown in FIG. 2A, the stream $x_{A1}(n)$ would include pilot symbols for the subbands in group 1, the stream $x_{A2}(n)$ would include pilot symbols for the subbands in group 2, and so on, and the stream $x_{Bt}(n)$ would include pilot symbols for the subbands in group T.

During data transmission, multiplexers/demultiplexers 630a and 630b each provide T/2 streams of transmit symbols for T/2 antennas, where each stream includes encoded symbols for the subbands assigned to the associated antenna and zero signal values for the unassigned subbands. For the transmission scheme shown in FIG. 3A, the streams $x_{A1}(n)$ and $x_{B1}(n)$ would include encoded symbols for the subbands in group 1, the streams $x_{A2}(n)$ and $x_{B2}(n)$ would include encoded symbols for the subbands in group 2, and so on, and the streams $x_{At}(n)$ and $x_{Bt}(n)$ would include encoded symbols for the subbands in group T/2.

Each modulator 522 processes a respective transmit symbol stream in the manner described below to provide an RF modulated signal for an associated antenna.

The STTD scheme is described in further detail by S. M. Alamouti in a paper entitled "A Simple Transmit Diversity Technique for Wireless Communications," IEEE Journal on Selected Areas in Communications, Vol. 16, No. 8, October 1998, pgs. 1451–1458, which is incorporated herein by reference. The STTD scheme is also described in U.S. patent application Ser. No. 10/179,439, entitled "Diversity Transmission Modes for MIMO OFDM Communication System," filed Jun. 24, 2002, assigned to the assignee of the present application and incorporated herein by reference.

The Walsh-STTD scheme employs a combination of (1) STTD to achieve orthogonality in a pair of antennas and (2) Walsh diversity to achieve orthogonality across multiple pairs of antennas. The Walsh-STTD scheme may be used in systems with more than two antennas (e.g., 4, 6, 8, and so on).

Figure 7A:
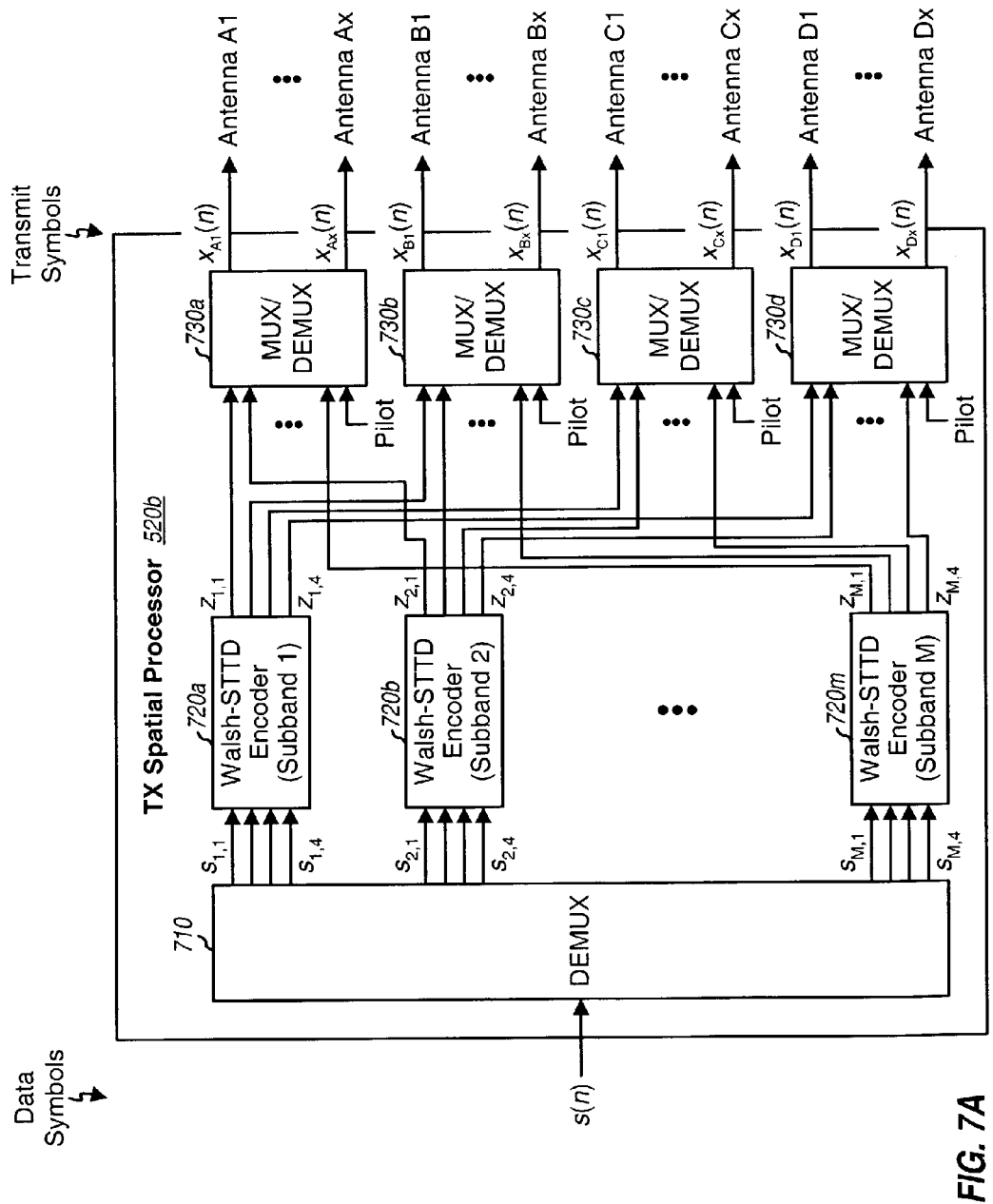
FIG. 7A shows a block diagram of a TX spatial processor that implements a Walsh-STTD scheme.

FIG. 7A shows a block diagram of a TX spatial processor 520b, which implements the Walsh-STTD scheme and is another embodiment of TX spatial processor 520 in FIG. 5. In this embodiment, 2-chip Walsh sequences are used for processing, and W=4. The data symbols s(n) are provided to a demultiplexer 710, which demultiplexes the symbols into 4M data symbol substreams (denoted as $s_{k,1}(n)$ through $s_{k,4}(n)$, for $k \in \{1 \ldots M\}$), one set of four substreams for each of the M usable subbands. The M sets of data symbol substreams for the M usable subbands are provided to M Walsh-STTD encoders 720a through 720m.

Each Walsh-STTD encoder 720 receives and processes its set of four data symbol substreams, $s_{k,1}(n)$ through $s_{k,4}(n)$, and provides four Walsh-STTD encoded symbol substreams, $Z_{k,1}(n)$ through $Z_{k,4}(n)$, to four multiplexers/demultiplexers 730a through 730d. The processing by encoder 720 is described below. Each multiplexer/demultiplexer 730 receives pilot symbols and M encoded symbol substreams from M Walsh-STTD encoders 720a through 720m, multiplexes the encoded symbols and pilot symbols based on a particular data/pilot transmission scheme, and provides T/4 streams of transmit symbols for T/4 antennas. Each transmit symbol stream includes pilot/encoded symbols for the subbands assigned to the antenna used to transmit that stream.

Figure 7B:
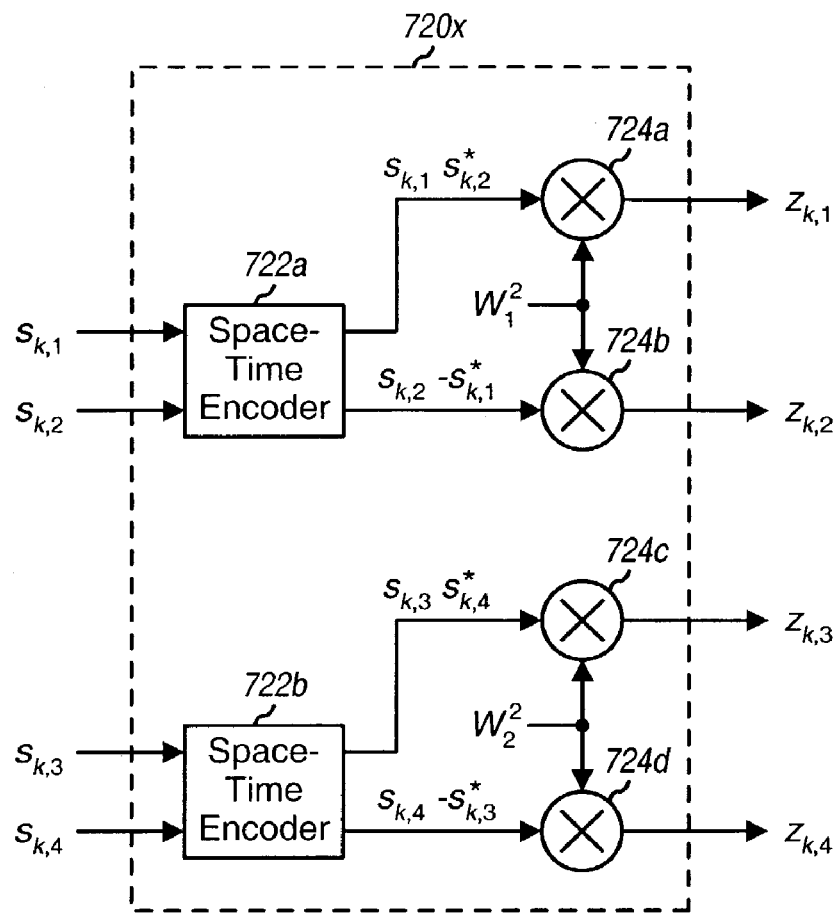
FIG. 7B shows a block diagram of a Walsh-STTD encoder.

FIG. 7B shows a block diagram of a Walsh-STTD encoder 720x, which may be used for each of encoders 720a through 720m in FIG. 7A. Within Walsh-STTD encoder 720x, a space-time encoder 722a receives the first pair of data symbol substreams, $s_{k,1}$ and $s_{k,2}$, and a space-time encoder 722b receives the second pair of data symbol substreams, $S_{k,3}$ and $s_{k,4}$. For each pair of data symbols in the two substreams in the first pair, space-time encoder 722a provides two vectors $\underline{X}_{k,1}=[s_{k,1} s_{k,2}{}^*]^T$ and $\underline{X}_{k,2}=[s_{k,4} -s_{k,3}{}^*]^T$ to multipliers 724a and 724b, respectively. Similarly, for each pair of data symbols in the two substreams in the second pair, space-time encoder 722b provides two vectors $\underline{X}^{k,3}=[s_{k,3} s_{k,4}{}^*]^T$ and $\underline{X}_{k,4}=[s_{k,4} -s_{k,3}{}^*]^T$ to multipliers 724c and 724d, respectively.

Multipliers 724a and 724b each also receive a first 2-chip Walsh sequence $W_1{}^2=[0\ 1]$, and multipliers 724c and 724d each also receive a second 2-chip Walsh sequence $W_2{}^2=[1\ 0]$. Each multiplier 724 then multiplies each symbol in its vector $\underline{X}_{k,i}$ with its Walsh sequence to provide two Walsh-STTD encoded symbols to be transmitted sequentially in two consecutive OFDM symbol periods on the k-th subband of the associated antenna. The four multipliers 724a through 724d provide four encoded symbol substreams to four multiplexers/demultiplexers 730a through 730d, respectively.

The Walsh-STTD scheme may also be implemented such that only one pair of data symbol substreams, $s_{k,1}$ and $s_{k,2}$, is provided to each Walsh-STTD encoder 720 and processed to provide the four encoded symbol substreams, $Z_{k,1}(n)$ through $Z_{k,4}(n)$. This may be used to achieve greater diversity at the expense of a lower data rate. The Walsh-STTD scheme is also described in further detail in the aforementioned U.S. patent application Ser. No. 10/179,439.

Figure 8:
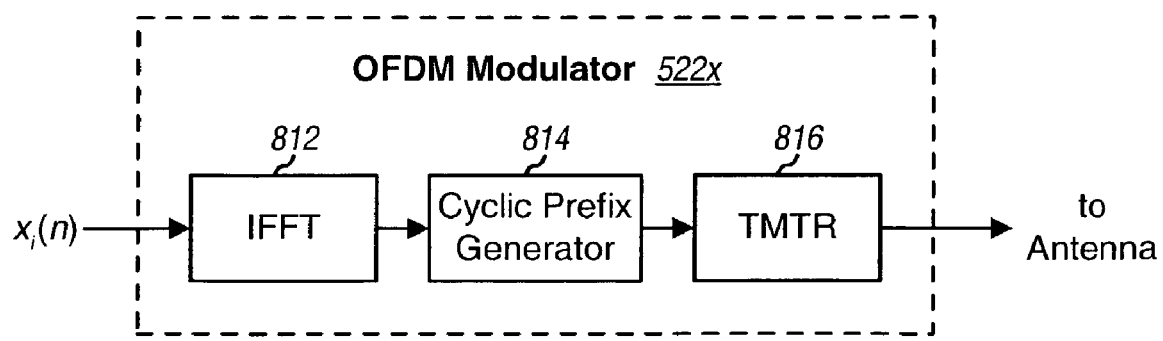
FIG. 8 shows a block diagram of an OFDM modulator.

FIG. 8 shows a block diagram of an embodiment of an OFDM modulator 522x, which may be used for each of the T modulators 522a through 522t in FIG. 5. Within OFDM modulator 522x, an inverse fast Fourier transform (IFFT)

unit 812 receives a stream of transmit symbols, $x_i(n)$, for the i-th antenna and converts each sequence of N transmit symbols into a time-domain transformed symbol using an N-point inverse fast Fourier transform, where N corresponds to the total number of subbands. Each sequence of N transmit symbols includes data/pilot symbols for the subbands assigned to the i-th antenna and zero signal values for the unassigned subbands. Each transformed symbol comprises N time-domain samples. For each transformed symbol, a cyclic prefix generator 814 repeats a portion (or C samples) of the transformed symbol to form a corresponding OFDM symbol comprised of N+C samples. A transmitter (TMTR) 816 receives and converts the stream of OFDM symbols from generator 814 into one or more analog signals, and further amplifies, filters, and frequency upconverts the analog signal(s) to generate an RF modulated signal for the i-th antenna.

The pilot and data transmission schemes described herein may be implemented by various means. For example, these techniques may be implemented in hardware, software, or a combination thereof. For a hardware implementation, the elements used to perform the processing at the transmitter and receiver units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the processing at the transmitter and receiver units for the transmission schemes described herein may be implemented with modules (e.g., procedures, functions, and so on) that perform the functions described herein. The software codes may be stored in memory units (e.g., memory units 532 and 582 in FIG. 5) and executed by processors (e.g., controllers 530 and 580). The memory units may be implemented within or external to the processors, in which case they can be communicatively coupled to the processors via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of transmitting from a multi-antenna communication device, comprising:

forming a plurality of groups of subbands with a plurality of subbands, wherein each of the plurality of groups includes a different subset of the plurality of subbands;

assigning each of a plurality of antennas with a different one of the plurality of groups; and transmitting from the plurality of antennas simultaneously using the plurality of groups of subbands, wherein the transmitting from each antenna occurs on the group of subbands assigned to the antenna, wherein for each antenna, a transmit power used for each of the subbands in the group assigned to the antenna is scaled higher than an average power obtained by distributing total transmit power across the plurality of subbands.

2. The method of claim 1, wherein pilot is transmitted from each antenna on the group of subbands assigned to the antenna.

3. The method of claim 1, wherein each of the plurality of groups includes the same number of subbands.

4. The method of claim 1, wherein the subbands in each of the plurality of groups are uniformly distributed across the plurality of subbands.

5. The method of claim 1, wherein the multi-antenna communication device utilizes orthogonal frequency division multiplexing (OFDM).

6. The method of claim 1, wherein each of the plurality of groups includes at least two disjoint subbands.

7. A method of transmitting data from a multi-antenna communication apparatus comprising:

forming a plurality of groups of subbands with a plurality of subbands, wherein each of the plurality of groups includes a different subset of the plurality of subbands;

assigning each of a plurality of antennas with one of the plurality of groups; and transmitting data from the plurality of antennas simultaneously using the plurality of groups of subbands, wherein data is transmitted from each antenna on the group of subbands assigned to the antenna, and wherein data is transmitted on each of the plurality of subbands by a particular group of at least two antennas, wherein for each antenna, a transmit power used for each of the subbands in the group assigned to the antenna is scaled higher than an average power obtained by distributing total transmit power across the plurality of subbands.

8. The method of claim 7, wherein each of the plurality of groups includes the same number of subbands.

9. The method of claim 7, wherein the subbands in each of the plurality of groups are uniformly distributed across the plurally of subbands.

10. The method of claim 7, wherein each of the plurality of antennas is assigned a different one of the plurality of groups.

11. The method of claim 7, wherein each pair of antennas in the plurality of antennas is assigned a different one of the plurality of groups.

12. The method of claim 7, wherein data is transmitted on each of the plurality of subbands by a particular group of two antennas.

13. The method of claim 7, further comprising:

processing data using space-time transmit diversity (STTD) encoding to provide two streams of symbols; and demultiplexing the two streams of symbols to provide a plurality of substreams of symbols, one substream for each of the plurality of antennas, wherein the demultiplexing is performed based on the group of subbands assigned to each antenna, and wherein each substream of symbols is transmitted from an associated antenna.

14. The method of claim 7, further comprising:

processing data using Walsh space-time transmit diversity (STTD)) encoding to provide W streams of symbols, where W is greater than two; and demultiplexing the W streams of symbols to provide a plurality of substreams of symbols, one substream for each of the plurality of antennas, wherein the demultiplexing is performed based on the group of subbands assigned to each antenna, and wherein each substream of symbols is transmitted from an associated antenna.

15. The method of claim 7, wherein the multi-antenna communication apparatus utilizes orthogonal frequency division multiplexing (OFDM).

16. The method of claim 7, wherein each of the plurality of groups includes at least two disjoint subbands.

17. An apparatus used in a multi-antenna communication system, comprising
    means for assigning each of a plurality of antennas with at least one of a plurality of groups of subbands, wherein the plurality of groups of subbands are formed from a plurality of subbands, and wherein each of the plurality of groups includes a different subset of the plurality of subbands; and
    means for transmitting from the plurality of antennas simultaneously using the plurality of groups of subbands, wherein transmission from each antenna occurs on the at least one group of subbands assigned to the antenna and in a manner to avoid interference among the plurality of antennas,
    wherein for each antenna, a transmit power used for each of the subbands in the group assigned to the antenna is scaled higher than an average power obtained by distributing total transmit power across the plurality of subbands.

18. The apparatus of claim 17, wherein each of the plurality of antennas is assigned a different one of the plurality of groups.

19. The apparatus of claim 17, wherein each of the plurality of antennas is assigned at least two groups of the plurality of groups, and wherein each of the at least two groups is used for a different symbol period.

20. The apparatus of claim 17, wherein for each symbol period the transmission for each of the plurality of subbands occurs from one of the plurality of antennas.

21. The apparatus of claim 17, wherein each of the plurality of groups includes at least two disjoint subbands.

22. A method of transmitting from a multi-antenna device, comprising:
    assigning a different group of a plurality of groups of subbands to each of a plurality of antennas, wherein each group of the plurality of groups is formed by a different subset of a plurality of subbands; and
    transmitting from the plurality of antennas using the different group of subbands, wherein a transmit power used for at least one subband in the group assigned to each antenna is scaled higher than an average power obtained by distributing total transmit power across the plurality of subbands.

23. The method of claim 22, wherein pilot is transmitted from each antenna on at least one subband of the group of subbands assigned to the antenna.

24. The method of claim 22, wherein each of the plurality of groups includes a same number of subbands.

25. The method of claim 22, wherein the subbands in each of the plurality of groups are uniformly distributed across the plurality of subbands.

26. The method of claim 22 wherein the multi-antenna device utilizes orthogonal frequency division multiplexing (OFDM).

27. The method of claim 22 wherein each of the plurality of groups includes at least two disjoint subbands.

28. A device, comprising:
    a memory; and
    a processor coupled with the memory, the processor capable of assigning a different group of a plurality of groups of subbands to each of a plurality of antennas, wherein each group of the plurality of groups is formed by a different subset of a plurality of subbands, and the processor further capable of setting a transmit power for at least one subband in each group assigned to each antenna to be scaled higher than an average power obtained by distributing total transmit power across the plurality of subbands.

29. The device of claim 28, wherein the processor assigns pilot to be transmitted from each antenna on a least one subband of the group of subbands assigned to the antenna.

30. The device of claim 28, wherein each of the plurality of groups includes a same number of subbands.

31. The device of claim 28, wherein the subbands in each of the plurality of groups are uniformly distributed across the plurality of subbands.

32. The device of claim 28, wherein each of the plurality of groups includes at least two disjoint subbands.

* * * * *